United States Patent
Satoh et al.

(10) Patent No.: US 10,457,606 B2
(45) Date of Patent: Oct. 29, 2019

(54) COMPOSITE SINTERED BODY

(71) Applicant: Sumitomo Electric Industries, Ltd., Osaka-shi (JP)

(72) Inventors: Takeshi Satoh, Itami (JP); Hitoshi Sumiya, Itami (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 28 days.

(21) Appl. No.: 15/119,973

(22) PCT Filed: Mar. 16, 2015

(86) PCT No.: PCT/JP2015/057643
§ 371 (c)(1),
(2) Date: Aug. 18, 2016

(87) PCT Pub. No.: WO2015/166730
PCT Pub. Date: Nov. 5, 2015

(65) Prior Publication Data
US 2017/0050886 A1    Feb. 23, 2017

(30) Foreign Application Priority Data

Apr. 30, 2014 (JP) .................. 2014-093395

(51) Int. Cl.
*C04B 35/52* (2006.01)
*B21C 3/02* (2006.01)
(Continued)

(52) U.S. Cl.
CPC .............. *C04B 35/52* (2013.01); *B21C 3/025* (2013.01); *B23B 27/14* (2013.01); *B23B 27/20* (2013.01);
(Continued)

(58) Field of Classification Search
CPC ..... B23B 27/14; B23B 27/20; B23C 2240/08; B23C 2226/31; B21C 3/025; C01B 31/06;
(Continued)

(56) References Cited

U.S. PATENT DOCUMENTS 3,816,085 A    6/1974   Hall
3,913,280 A    10/1975  Hall
(Continued)

FOREIGN PATENT DOCUMENTS

JP    S50-133993 A    10/1975
JP    H09-142933 A    6/1997
(Continued)

OTHER PUBLICATIONS

International Search Report in International Application No. PCT/JP2015/057643, dated Jun. 2, 2015.

*Primary Examiner* — Cheng Yuang Huang
(74) *Attorney, Agent, or Firm* — Baker Botts L.L.P.; Michael A. Sartori

(57) ABSTRACT

A composite sintered body includes a diamond phase and a non-diamond carbon phase. A non-diamond carbon phase occupancy rate is higher than 0% and not higher than 30%. The non-diamond carbon phase occupancy rate is a percentage of an area of the non-diamond carbon phase to a total area of one arbitrarily specified cross section of the composite sintered body. As a result, there is provided a high wear-resistant, high local wear-resistant and high chipping-resistant diamond-containing composite sintered body suitably used as a material for a wear-resistant tool, a cutting tool and the like.

2 Claims, 1 Drawing Sheet

(51) Int. Cl.
*B23B 27/14* (2006.01)
*B23B 27/20* (2006.01)
*B23C 5/18* (2006.01)
*C04B 35/528* (2006.01)
*C04B 35/645* (2006.01)
*C01B 32/25* (2017.01)

(52) U.S. Cl.
CPC .............. *B23C 5/18* (2013.01); *C01B 32/25* (2017.08); *C04B 35/528* (2013.01); *C04B 35/645* (2013.01); *B23C 2226/31* (2013.01); *B23C 2240/08* (2013.01); *C04B 2235/422* (2013.01); *C04B 2235/425* (2013.01); *C04B 2235/427* (2013.01); *C04B 2235/785* (2013.01); *C04B 2235/80* (2013.01); *C04B 2235/96* (2013.01)

(58) Field of Classification Search
CPC .............. C04B 35/52; C04B 2235/427; C04B 2235/785; C04B 2235/80; C04B 2235/422
See application file for complete search history.

(56) References Cited

U.S. PATENT DOCUMENTS

| | | | | |
|---|---|---|---|---|
| 5,851,658 | A | * 12/1998 | Yamamoto | ............ C23C 16/274 428/334 |
| 2007/0009374 | A1 | 1/2007 | Akaishi et al. | |
| 2010/0146865 | A1 | 6/2010 | Sato et al. | |

FOREIGN PATENT DOCUMENTS

| | | |
|---|---|---|
| JP | 2003-292397 A | 10/2003 |
| JP | 2004-196595 A | 7/2004 |
| JP | 2005-239472 A | 9/2005 |
| JP | 2011-190124 A | 9/2011 |
| WO | WO-2009/099130 A1 | 8/2009 |

\* cited by examiner

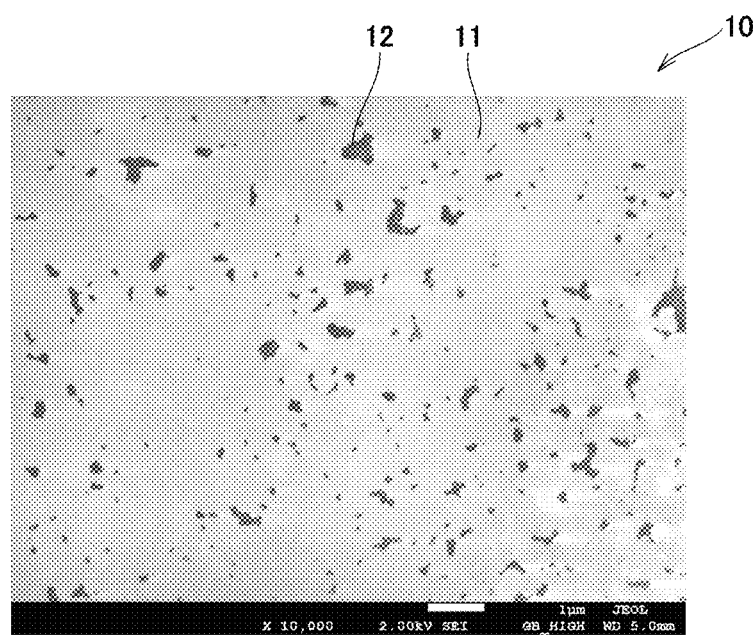

COMPOSITE SINTERED BODY

TECHNICAL FIELD

The present invention relates to a diamond-containing composite sintered body. Specifically, the present invention relates to a diamond-containing composite sintered body suitably used as a material for a wear-resistant tool, a cutting tool and the like.

BACKGROUND ART

Diamond is a highest hardness substance among the substances existing on earth, and thus, a sintered body including diamond has been used as a material for a wear-resistant tool, a cutting tool and the like.

Japanese Patent Laying-Open No. 2003-292397 (PTD 1) discloses a diamond polycrystalline body which is a sintered body composed of diamond converted and sintered from a carbon substance of a graphite-type layered structure under ultrahigh pressure and ultrahigh temperature without addition of a sintering aid and a catalyst, wherein an average particle size of diamond is not larger than 100 nm and a purity is not lower than 99%. Japanese Patent Laying-Open No. 2003-292397 (PTD 1) also discloses a method for manufacturing the diamond polycrystalline body by direct conversion without addition of a sintering aid and a catalyst, by putting a non-diamond carbon substance into a pressure cell including indirectly heating means, and performing heating and pressing.

International Publication No. 2009/099130 (PTD 2) discloses a diamond polycrystalline body obtained by being converted and sintered from non-diamond-type carbon under ultrahigh pressure and ultrahigh temperature without addition of a sintering aid and a catalyst, wherein an average particle size of sintered diamond particles forming the diamond polycrystalline body is larger than 50 nm and smaller than 2500 nm, and a purity is not lower than 99%, and a D90 particle size of diamond is not larger than (average particle size+average particle size×0.9).

Japanese Patent Laying-Open No. 9-142933 (PTD 3) discloses a diamond sintered body including 0.1 to 30 volume % of a substance composed of oxide and/or oxy-carbide and/or carbide of a rare-earth element, and the balance diamond.

Japanese Patent Laying-Open No. 2005-239472 (PTD 4) discloses a high-strength and high wear-resistant diamond sintered body including sintered diamond particles having an average particle size of not larger than 2 μm, and the balance a binder phase, wherein a content rate of the sintered diamond particles in the diamond sintered body is not lower than 80 volume % and not higher than 98 volume %, the binder phase includes cobalt and at least one or more types of elements selected from the group consisting of titanium, zirconium, hafnium, vanadium, niobium, tantalum, chromium, and molybdenum, a content rate of cobalt in the binder phase is not lower than 50 mass % and lower than 99.5 mass %, a content rate of the at least one or more types of elements in the binder phase is not lower than 0.5 mass % and lower than 50 mass %, a part or all of the at least one or more types of elements selected from the group consisting of titanium, zirconium, hafnium, vanadium, niobium, tantalum, chromium, and molybdenum is present as carbide particles having an average particle size of not larger than 0.8 μm, a structure of the carbide particles is discontinuous, and adjacent sintered diamond particles are coupled to each other.

CITATION LIST

Patent Document

PTD 1: Japanese Patent Laying-Open No. 2003-292397
PTD 2: International Publication No. 2009/099130
PTD 3: Japanese Patent Laying-Open No. 9-142933
PTD 4: Japanese Patent Laying-Open No. 2005-239472

SUMMARY OF INVENTION

Technical Problem

The diamond polycrystalline bodies disclosed in Japanese Patent Laying-Open No. 2003-292397 (PTD 1) and International Publication No. 2009/099130 (PTD 2) had such a problem that when the diamond polycrystalline bodies are applied to a wire drawing die which is a wear-resistant tool, a pull-out resistance at the time of wire drawing increases, a wire diameter after wire drawing decreases and a wire breakage occurs frequently due to local wear. The diamond polycrystalline bodies also had such a problem that when the diamond polycrystalline bodies are applied to a scribe wheel or an excavating bit which is a cutting tool, a tool lifetime becomes shorter due to local wear, chipping caused by impact, and the like.

The diamond sintered bodies disclosed in Japanese Patent Laying-Open No. 9-142933 (PTD 3) and Japanese Patent Laying-Open No. 2005-239472 (PTD 4) had such a problem that when the diamond sintered bodies are applied to a wire drawing die which is a wear-resistant tool, a friction coefficient becomes higher due to an oxide of a metal and a metal in the sintered bodies, and thus, a wire drawing resistance increases, a wire diameter after wire drawing decreases and a wire breakage occurs frequently. The diamond sintered bodies also had such a problem that when the diamond sintered bodies are applied to a scribe wheel or an excavating bit which is a cutting tool, a friction coefficient becomes higher due to an oxide of a metal and a metal in the sintered bodies, and thus, a cutting resistance increases, and a tool lifetime becomes shorter due to internal fracture caused by thermal expansion of the metal in the sintered bodies.

Thus, an object is to provide a high wear-resistant, high local wear-resistant and high chipping-resistant diamond-containing composite sintered body suitably used as a material for a wear-resistant tool, a cutting tool and the like, while suppressing local wear, chipping caused by impact, an increase in friction coefficient caused by a non-diamond component in the sintered body, and internal fracture caused by thermal expansion.

Solution to Problem

A composite sintered body according to an aspect of the present invention is a composite sintered body including a diamond phase and a non-diamond carbon phase, a non-diamond carbon phase occupancy rate being higher than 0% and not higher than 30%, the non-diamond carbon phase occupancy rate being a percentage of an area of the non-diamond carbon phase to a total area of one arbitrarily specified cross section of the composite sintered body.

Advantageous Effects of Invention

According to such an aspect, there can be provided a high wear-resistant, high local wear-resistant and high chipping-resistant diamond-containing composite sintered body suitably used as a material for a wear-resistant tool, a cutting tool and the like, while suppressing local wear, chipping caused by impact, an increase in friction coefficient caused by a non-diamond component in the sintered body, and internal fracture caused by thermal expansion.

BRIEF DESCRIPTION OF DRAWINGS

FIG. 1 is a scanning electron microscope photograph showing an example of one arbitrarily specified cross section of a composite sintered body according to an aspect of the present invention.

DESCRIPTION OF EMBODIMENTS

Description of Embodiment of the Present Invention

A composite sintered body that is an embodiment of the present invention is a composite sintered body including a diamond phase and a non-diamond carbon phase, a non-diamond carbon phase occupancy rate being higher than 0% and not higher than 30%, the non-diamond carbon phase occupancy rate being a percentage of an area of the non-diamond carbon phase to a total area of one arbitrarily specified cross section of the composite sintered body.

Since the composite sintered body of the present embodiment includes the diamond phase and the non-diamond carbon phase and the non-diamond carbon phase occupancy rate is higher than 0% and not higher than 30%, the composite sintered body of the present embodiment has a high wear resistance, a high local wear resistance and a high chipping resistance.

In the composite sintered body of the present embodiment, an average particle size of sintered diamond particles forming the diamond phase can be not larger than 1000 nm. As a result, the wear resistance, the local wear resistance and the chipping resistance become higher.

In the composite sintered body of the present embodiment, an average particle size of sintered non-diamond carbon particles forming the non-diamond carbon phase can be not larger than 2000 nm. As a result, the wear resistance, the local wear resistance and the chipping resistance become higher.

A Knoop hardness of the composite sintered body of the present embodiment can be not lower than 50 GPa. As a result, the wear resistance and the chipping resistance become higher.

Details of Embodiment of the Present Invention (Composite Sintered Body)

Referring to FIG. 1, a composite sintered body 10 of the present embodiment is composite sintered body 10 including a diamond phase 11 and a non-diamond carbon phase 12, wherein a non-diamond carbon phase occupancy rate is higher than 0% and not higher than 30%, and the non-diamond carbon phase occupancy rate is a percentage of an area of non-diamond carbon phase 12 to a total area of one arbitrarily specified cross section of composite sintered body 10.

Since composite sintered body 10 of the present embodiment includes diamond phase 11 and non-diamond carbon phase 12 and the non-diamond carbon phase occupancy rate is higher than 0% and not higher than 30%, composite sintered body 10 of the present embodiment has a high wear resistance, a high local wear resistance and a high chipping resistance.

Diamond phase 11 of composite sintered body 10 is formed by sintered diamond particles. The presence of diamond phase 11 is recognized as a bright field in observation of a cross section (one arbitrarily specified cross section, and the same is also applied to the following description) of composite sintered body 10 by an SEM (scanning electron microscope) or a TEM (transmission electron microscope), and is identified with composition analysis and crystal structure analysis by X-ray diffraction.

Non-diamond carbon phase 12 of composite sintered body 10 is formed by sintered non-diamond carbon particles. The presence of non-diamond carbon phase 12 is recognized as a dark field in observation of the cross section of composite sintered body 10 by the SEM or the TEM, and is identified with composition analysis and crystal structure analysis by X-ray diffraction. The non-diamond carbon herein refers to solid carbon having a phase morphology other than that of diamond, and includes graphite, amorphous carbon and the like.

The non-diamond carbon phase occupancy rate refers to a percentage of the area of non-diamond carbon phase 12 to the total area of one arbitrarily specified cross section of composite sintered body 10. The non-diamond carbon phase occupancy rate is calculated as a percentage of the area of non-diamond carbon phase 12 recognized as a dark field in observation of the cross section of composite sintered body 10 by the SEM or the TEM, to a sum (corresponding to the total area of the cross section) of the area of diamond phase 11 recognized as a bright field and the area of non-diamond carbon phase 12 recognized as a dark field.

From the perspective of enhancing the local wear resistance and the chipping resistance of composite sintered body 10, the non-diamond carbon phase occupancy rate is not higher than 30%, preferably not higher than 20%, and more preferably not higher than 15%. In addition, from the perspective of enhancing the wear resistance of composite sintered body 10, the non-diamond carbon phase occupancy rate is higher than 0%, preferably not lower than 5%, and more preferably not lower than 10%.

It is preferable that composite sintered body 10 substantially includes only diamond phase 11 and non-diamond carbon phase 12, and does not include the other components such as a sintering aid and a catalyst. Namely, it is preferable that, other than diamond phase 11 and non-diamond carbon phase 12, composite sintered body 10 includes only an impurity inevitably included in diamond phase 11 and non-diamond carbon phase 12. Since such composite sintered body 10 does not substantially include the other components such as, for example, a sintering aid and a catalyst except for diamond phase 11 and non-diamond carbon phase 12, composite sintered body 10 is not affected by these other components, and thus, the wear resistance, the local wear resistance and the chipping resistance can be maintained at a high level.

From the perspective of enhancing the local wear resistance and the chipping resistance of composite sintered body 10, an average particle size of the sintered diamond particles forming diamond phase 11 of composite sintered body 10 is preferably not larger than 1000 nm, and more preferably not larger than 500 nm. In addition, from the perspective of enhancing the wear resistance, the average particle size of the sintered diamond particles is preferably not smaller than 30 nm, and more preferably not smaller than 50 nm. Here, the average particle size of the sintered diamond particles forming diamond phase 11 is obtained by taking a photograph under a condition that allows distinguishing among diamond phase 11, non-diamond carbon phase 12 and a grain boundary therebetween, in observation of the cross section of composite sintered body 10 by the SEM or the TEM, and thereafter, performing image processing (such as binarization) to calculate an average of areas of the respective sintered diamond particles forming diamond phase 11, and calculate a diameter of a circle having the same area as this area.

From the perspective of enhancing the local wear resistance and the chipping resistance of composite sintered body 10, an average particle size of the sintered non-diamond carbon particles forming non-diamond carbon phase 12 of composite sintered body 10 is preferably not larger than 2000 nm, and more preferably not larger than 300 nm. In addition, from the perspective of enhancing the wear resistance, the average particle size of the sintered non-diamond carbon particles is preferably not smaller than 50 nm, and more preferably not smaller than 100 nm. Here, the average particle size of the sintered non-diamond carbon particles forming non-diamond carbon phase 12 is obtained by taking a photograph under a condition that allows distinguishing among diamond phase 11, non-diamond carbon phase 12 and a grain boundary therebetween, in observation of the cross section of composite sintered body 10 by the SEM or the TEM, and thereafter, performing image processing (such as binarization) to calculate an average of areas of the respective sintered non-diamond carbon particles forming non-diamond carbon phase 12, and calculate a diameter of a circle having the same area as this area.

From the perspective of enhancing the wear resistance of composite sintered body 10, a Knoop hardness of composite sintered body 10 is preferably not lower than 50 GPa, and more preferably not lower than 70 GPa. Here, the Knoop hardness is measured at a measurement load of 9.8 N (1.0 kgf) by using a Knoop indenter.

[Method for Manufacturing Composite Sintered Body]

A method for manufacturing composite sintered body 10 of the present embodiment is not particularly limited. However, from the perspective of manufacturing composite sintered body 10 having a high wear resistance, a high local wear resistance and a high chipping resistance in an efficient manner and at low cost, the method for manufacturing composite sintered body 10 of the present embodiment preferably includes a raw material preparation step of preparing raw material non-diamond carbon or a mixture of raw material non-diamond carbon and raw material diamond as a raw material, and a composite sintered body formation step of forming a composite sintered body by sintering the aforementioned raw material under conditions of a temperature and a pressure at which a diamond phase is formed.

The raw material non-diamond carbon prepared in the raw material preparation step may be a powder or a molded body. However, from the perspective of forming a homogeneous composite sintered body, the raw material non-diamond is preferably a powder, and an average particle size of the powder is preferably not larger than 5000 nm, and more preferably not larger than 2000 nm. In addition, from the perspective of forming a composite sintered body with high quality and high purity, the raw material non-diamond carbon is preferably graphite, and a purity of graphite is preferably not lower than 99 mass %, and more preferably not lower than 99.5 mass %.

From the perspective of forming a homogeneous composite sintered body, the raw material diamond prepared in the raw material preparation step is preferably a powder, and an average particle size of the powder is preferably not larger than 5000 nm, and more preferably not larger than 1000 nm. In addition, from the perspective of forming a composite sintered body with high quality and high purity, a purity of the raw material diamond is preferably not lower than 90 mass %, and more preferably not lower than 95 mass %.

In the composite sintered body formation step, the sintering conditions are not particularly limited as long as the sintering conditions are conditions of a temperature and a pressure at which the diamond phase is formed. However, from the perspective of efficiently forming the diamond phase and easily adjusting the non-diamond carbon phase occupancy rate, conditions of a temperature not lower than 1800° C. and not higher than 2300° C. and a pressure not lower than 8 GPa and not higher than 16 GPa are preferable. A high-temperature and high-pressure generating apparatus for generating such high temperature and high pressure is not particularly limited, and examples of the high-temperature and high-pressure generating apparatus include a belt-type apparatus, a cubic-type apparatus, a split sphere-type apparatus and the like.

EXAMPLES

Example 1

1. Preparation of Raw Material

As a raw material, 0.4 g of a graphite molded body having a density of 1.85 g/cm$^3$ and a purity of 99.95 mass % was prepared.

2. Formation of Composite Sintered Body

By using the high-temperature and high-pressure generating apparatus, the aforementioned graphite molded body serving as the raw material was sintered under the sintering conditions of a temperature of 1900° C., a pressure of 15 GPa and 100 minutes, to thereby obtain a composite sintered body.

3. Evaluation of Properties of Composite Sintered Body

With contrast analysis of one cross section of the composite sintered body by the SEM, a diamond phase and a non-diamond carbon phase in the composite sintered body were recognized and identified. A non-diamond carbon phase occupancy rate was calculated from the aforementioned SEM observation. Then, the non-diamond carbon phase occupancy rate was 1%. An average particle size of sintered diamond particles forming the diamond phase was calculated from the aforementioned SEM observation. Then, the average particle size of the sintered diamond particles was 50 nm. An average particle size of sintered non-diamond carbon particles forming the non-diamond carbon phase was calculated from the aforementioned SEM observation. Then, the average particle size of the sintered non-diamond carbon particles was 80 nm. A Knoop hardness of the composite sintered body was measured under a load of 9.8 N by using a Knoop indenter. Then, the Knoop hardness of the composite sintered body was 95 GPa. Furthermore, this composite sintered body was used to fabricate a wire drawing die having an opening size of 20 μm, and SUS 304 (stainless steel) was drawn at a wire drawing speed of 1000 m/min. Relative values of a frequency of wire breakage and a wire drawing distance until the opening size of the wire drawing die increased to 20.5 μm were 0.50 and 150, respectively, assuming that values of the frequency of wire breakage and the wire drawing distance in the case of a composite sintered body in Comparative Example 1 described below were 1.00 and 100, respectively. Here, a lower relative value of the frequency of wire breakage and a higher relative value of the wire drawing distance are more preferable because the wear resistance and the local wear resistance are high. Furthermore, the composite sintered body was brazed to a superhard base metal, and a cutting tool having a tip end angle of 90° and a tip end radius of curvature (R) of 100 nm was fabricated, and a 30 mm-thick copper plate was plated with nickel to a thickness of 20 μm to obtain a nickel-plated metal plate and grooves having a depth of 5 μm were formed in the metal plate at pitches of 10 μm. A chipped state (cracking and chipping) of the tip end portion when the tip end of the cutting tool became worn by 10 μm was evaluated in terms of an amount of chipping. A relative value of the amount of chipping in the cutting tool was 0.8, assuming that a value of the amount of chipping in the cutting tool in the case of the composite sintered body in Comparative Example 1 described below was 1.0. Here, a lower relative value of the amount of chipping is more preferable because the chipping resistance is high. The result was summarized in Table 1.

Example 2

1. Preparation of Raw Material

As a raw material, 0.4 g of a graphite molded body similar to that of Example 1 was prepared.

2. Formation of Composite Sintered Body

By using the high-temperature and high-pressure generating apparatus, the aforementioned graphite molded body serving as the raw material was sintered under the sintering conditions of a temperature of 2200° C., a pressure of 11 GPa and 100 minutes, to thereby obtain a composite sintered body.

3. Evaluation of Properties of Composite Sintered Body

Similarly to Example 1, a diamond phase and a non-diamond carbon phase in the composite sintered body were recognized and identified. FIG. 1 shows an SEM photograph of one cross section of the composite sintered body in the present Example. The non-diamond carbon phase occupancy rate was 4%, and the average particle size of sintered diamond particles forming the diamond phase was 70 nm, and the average particle size of sintered non-diamond carbon particles forming the non-diamond carbon phase was 110 nm, and the Knoop hardness of the composite sintered body was 80 GPa. Furthermore, the relative values of the frequency of wire breakage and the wire drawing distance in the wire drawing die evaluated similarly to Example 1 were 0.25 and 135, respectively. The relative value of the amount of chipping in the cutting tool evaluated similarly to Example 1 was 0.5. The result was summarized in Table 1.

Example 3

1. Preparation of Raw Material

As a raw material, 0.4 g of a mixed powder was prepared. The mixed powder was obtained by uniformly mixing a graphite powder having an average particle size of 1500 nm and a purity of 99.95 mass % and a diamond powder having an average particle size of 1000 nm and a purity of 99.9 mass % at a mass ratio of 1:4 by using a ball mill.

2. Formation of Composite Sintered Body

By using the high-temperature and high-pressure generating apparatus, the aforementioned mixed powder serving as the raw material was sintered under the sintering conditions of a temperature of 2200° C., a pressure of 11 GPa and 50 minutes, to thereby obtain a composite sintered body.

3. Evaluation of Properties of Composite Sintered Body

Similarly to Example 1, a diamond phase and a non-diamond carbon phase in the composite sintered body were recognized and identified. The non-diamond carbon phase occupancy rate was 10%, and the average particle size of sintered diamond particles forming the diamond phase was 500 nm, and the average particle size of sintered non-diamond carbon particles forming the non-diamond carbon phase was 800 nm, and the Knoop hardness of the composite sintered body was 60 GPa. Furthermore, the relative values of the frequency of wire breakage and the wire drawing distance in the wire drawing die evaluated similarly to Example 1 were 0.25 and 120, respectively. The relative value of the amount of chipping in the cutting tool evaluated similarly to Example 1 was 0.6. The result was summarized in Table 1.

Example 4

1. Preparation of Raw Material

As a raw material, 0.4 g of a uniformly mixed powder was prepared similarly to Example 3, except that a mixing ratio between a graphite powder and a diamond powder was a mass ratio of 9:11.

2. Formation of Composite Sintered Body

By using the high-temperature and high-pressure generating apparatus, the aforementioned mixed powder serving as the raw material was sintered under the sintering conditions of a temperature of 2200° C., a pressure of 11 GPa and 50 minutes, to thereby obtain a composite sintered body.

3. Evaluation of Properties of Composite Sintered Body

Similarly to Example 1, a diamond phase and a non-diamond carbon phase in the composite sintered body were recognized and identified. The non-diamond carbon phase occupancy rate was 30%, and the average particle size of sintered diamond particles forming the diamond phase was 800 nm, and the average particle size of sintered non-diamond carbon particles forming the non-diamond carbon phase was 1300 nm, and the Knoop hardness of the composite sintered body was 55 GPa. Furthermore, the relative values of the frequency of wire breakage and the wire drawing distance in the wire drawing die evaluated similarly to Example 1 were 0.20 and 110, respectively. The relative value of the amount of chipping in the cutting tool evaluated similarly to Example 1 was 0.7. The result was summarized in Table 1.

Comparative Example 1

1. Preparation of Raw Material

As a raw material, 0.4 g of a graphite molded body similar to that of Example 1 was prepared.

2. Formation of Composite Sintered Body

By using the high-temperature and high-pressure generating apparatus, the aforementioned graphite molded body serving as the raw material was sintered under the sintering conditions of a temperature of 2200° C., a pressure of 15 GPa and 100 minutes, to thereby obtain a composite sintered body.

3. Evaluation of Properties of Composite Sintered Body

By using the method similar to that of Example 1, a diamond phase in the composite sintered body was recognized and identified. However, a non-diamond carbon phase was not recognized. Namely, the non-diamond carbon phase occupancy rate was 0%. The average particle size of sintered diamond particles forming the diamond phase was 50 nm, and the Knoop hardness of the composite sintered body was 120 GPa. Furthermore, the relative values of the frequency of wire breakage and the wire drawing distance in the wire drawing die evaluated similarly to Example 1 were 1.00 and 100, respectively. The relative value of the amount of chipping in the cutting tool evaluated similarly to Example 1 was 1.0. The result was summarized in Table 1.

Comparative Example 2

1. Preparation of Raw Material

As a raw material, 0.4 g of a graphite molded body similar to that of Example 1 was prepared.

2. Formation of Composite Sintered Body

By using the high-temperature and high-pressure generating apparatus, the aforementioned graphite molded body serving as the raw material was sintered under the sintering conditions of a temperature of 1900° C., a pressure of 11 GPa and 300 minutes, to thereby obtain a composite sintered body.

3. Evaluation of Properties of Composite Sintered Body

Similarly to Example 1, a diamond phase and a non-diamond carbon phase in the composite sintered body were recognized and identified. The non-diamond carbon phase occupancy rate was 40%, and the average particle size of sintered diamond particles forming the diamond phase was 150 nm, and the average particle size of sintered non-diamond carbon particles forming the non-diamond carbon phase was 200 nm, and the Knoop hardness of the composite sintered body was 45 GPa. Furthermore, the relative values of the frequency of wire breakage and the wire drawing distance in the wire drawing die evaluated similarly to Example 1 were 0.17 and 80, respectively. The relative value of the amount of chipping in the cutting tool evaluated similarly to Example 1 was 1.2. The result was summarized in Table 1.

Referring to Table 1, it became clear that the composite sintered body including the diamond phase and the non-diamond carbon phase and having a non-diamond carbon phase occupancy rate of higher than 0% and not higher than 30% as shown in each of Examples 1 to 4 was lower in frequency of wire breakage, longer in wire drawing distance, and smaller in amount of chipping, that is, higher in wear resistance, local wear resistance and chipping resistance, than the composite sintered body including only the diamond phase as shown in Comparative Example 1 (i.e., the composite sintered body having a non-diamond carbon phase occupancy rate of 0%) and the composite sintered body including the diamond phase and the non-diamond carbon phase and having a non-diamond carbon phase occupancy rate of 40% as shown in Comparative Example 2.

It should be understood that the embodiment and examples disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST 10 composite sintered body; 11 diamond phase; 12 non-diamond carbon phase.

The invention claimed is:

1. A composite sintered body comprising a diamond phase and a non-diamond carbon phase,
   a non-diamond carbon phase occupancy rate being not lower than 1% and not higher than 30%, the non-diamond carbon phase occupancy rate being a percentage of an area of the non-diamond carbon phase to a total area of one arbitrarily specified cross section of the composite sintered body,
   an average particle size of sintered diamond particles forming the diamond phase being not smaller than 50 nm and not larger than 800 nm, and
   an average particle size of sintered non-diamond carbon particles forming the non-diamond carbon phase being not smaller than 80 nm and not larger than 1300 nm,

TABLE 1

| | | Comparative Example 1 | Example 1 | Example 2 | Example 3 | Example 4 | Comparative Example 2 |
|---|---|---|---|---|---|---|---|
| Raw Material | Graphite Molded Body (g) | 0.4 | 0.4 | 0.4 | — | — | 0.4 |
| | Graphite Powder [G] (g) | — | — | — | 0.08 | 0.18 | — |
| | Diamond Powder [D] (g) | — | — | — | 0.32 | 0.22 | — |
| | Mixing Mass Ratio [G:D] | — | — | — | 1:4 | 9:11 | — |
| Sintering Conditions | Temperature (° C.) | 2200 | 1900 | 2200 | 2200 | 2200 | 1900 |
| | Pressure (GPa) | 15 | 15 | 11 | 11 | 11 | 11 |
| | Time (min) | 100 | 100 | 100 | 50 | 50 | 300 |
| Properties of Composite Sintered Body | Non-diamond Carbon Phase Occupancy Rate (%) | 0 | 1 | 4 | 10 | 30 | 40 |
| | Average Particle Size of Sintered Diamond Particles (nm) | 50 | 50 | 70 | 500 | 800 | 150 |
| | Average Particle Size of Sintered Non-diamond Carbon Particles (nm) | — | 80 | 110 | 800 | 1300 | 200 |
| | Knoop Hardness (GPa) | 120 | 95 | 80 | 60 | 55 | 45 |
| | Wire Drawing Die — Frequency of Wire Breakage | 1.00 | 0.50 | 0.25 | 0.25 | 0.20 | 0.17 |
| | Wire Drawing Distance | 100 | 150 | 135 | 120 | 110 | 80 |
| | Cutting Tool — Amount of Chipping | 1.0 | 0.8 | 0.5 | 0.6 | 0.7 | 1.2 | wherein
the non-diamond carbon phase is a graphite phase.

2. The composite sintered body according to claim 1, wherein
a Knoop hardness of the composite sintered body is not lower than 50 GPa.

\* \* \* \* \*